United States Patent
Ohkawa

[19]

[11] Patent Number: 6,155,692
[45] Date of Patent: Dec. 5, 2000

[54] SURFACE LIGHT SOURCE DEVICE OF SIDE LIGHT TYPE

[75] Inventor: Shingo Ohkawa, Koshigaya, Japan

[73] Assignees: Enplas Corporation, Kawaguchi; Yasuhiro Koike, Yakohama, both of Japan

[21] Appl. No.: 09/168,220

[22] Filed: Oct. 8, 1998

[30] Foreign Application Priority Data

Oct. 15, 1997 [JP] Japan .................................. 9-297865

[51] Int. Cl.[7] ...................................................... F21V 7/04
[52] U.S. Cl. ............................ 362/31; 385/901; 385/129; 359/628
[58] Field of Search .............................. 359/628; 349/65, 349/62; 385/129, 146, 901; 362/31, 26

[56] References Cited

U.S. PATENT DOCUMENTS

| | | | |
|---|---|---|---|
| 5,303,322 | 4/1994 | Winston et al. | 385/901 |
| 5,408,388 | 4/1995 | Kobayashi et al. | 362/31 |
| 5,485,291 | 1/1996 | Qiao et al. | 385/901 |
| 5,659,410 | 8/1997 | Koike et al. | 362/31 |
| 5,735,590 | 4/1998 | Kashima et al. | 362/31 |
| 5,833,344 | 11/1998 | Arai et al. | 362/31 |
| 5,838,404 | 11/1998 | Ozeki et al. | 385/146 |
| 5,854,872 | 12/1998 | Tai | 385/901 |
| 5,890,791 | 4/1999 | Saito | 362/31 |
| 5,919,551 | 6/1999 | Cobb, Jr. et al. | 428/156 |
| 5,999,685 | 12/1999 | Goto et al. | 385/901 |

FOREIGN PATENT DOCUMENTS

544322 A1   6/1993   European Pat. Off. .................. 349/65

*Primary Examiner*—Thong Nguyen
*Assistant Examiner*—John Juba, Jr.
*Attorney, Agent, or Firm*—Staas & Halsey LLP

[57] ABSTRACT

A surface light source device of side light type is provided with guide plate, a primary light source, a reflection sheet and a prism sheet. The back surface of the guide plate provides a light control surface (arrows D to F). This light control surface has a great number of projections running generally at right angles to an incidence end surface. Each projection includes a pair of slopes. Inclination angles of the slopes of the pair with respect to a normal to a general plane of the guide plate are equal to each other on a generally central portion of an emission surface, while inclination angles of respective inner slopes become larger gradually than those of respective outer slopes toward areas near both side portions, as viewed from an incidence end surface. Length between two side edges of the guide plate may be larger than length thereof along the running direction of the projections, as viewed from the incidence end surface. An emission surface of the guide plate may provide a light control surface, in which a pair of slopes of each projection thereof may be provided with different inclination angles in a similar fashion.

10 Claims, 10 Drawing Sheets

10: SURFACE LIGHT SOURCE DEVICE OF SIDE LIGHT TYPE

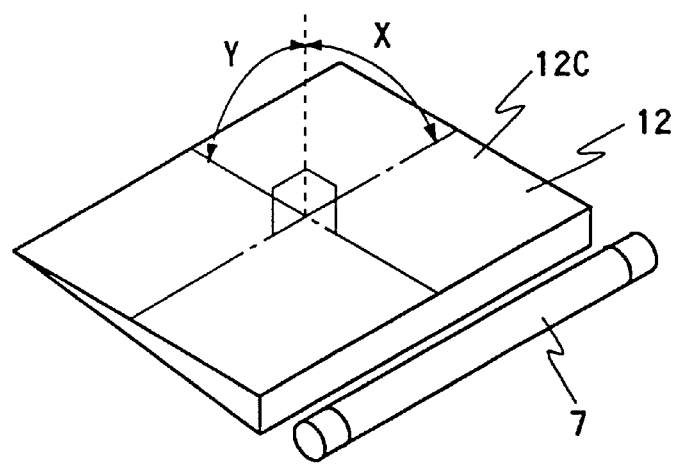
F I G. 3
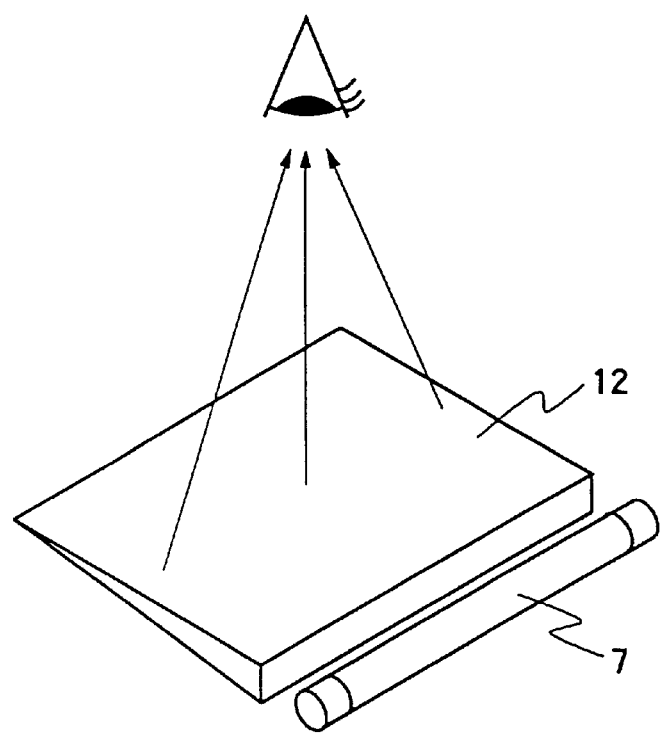
F I G. 4

20: SURFACE LIGHT SOURCE DEVICE OF SIDE LIGHT TYPE

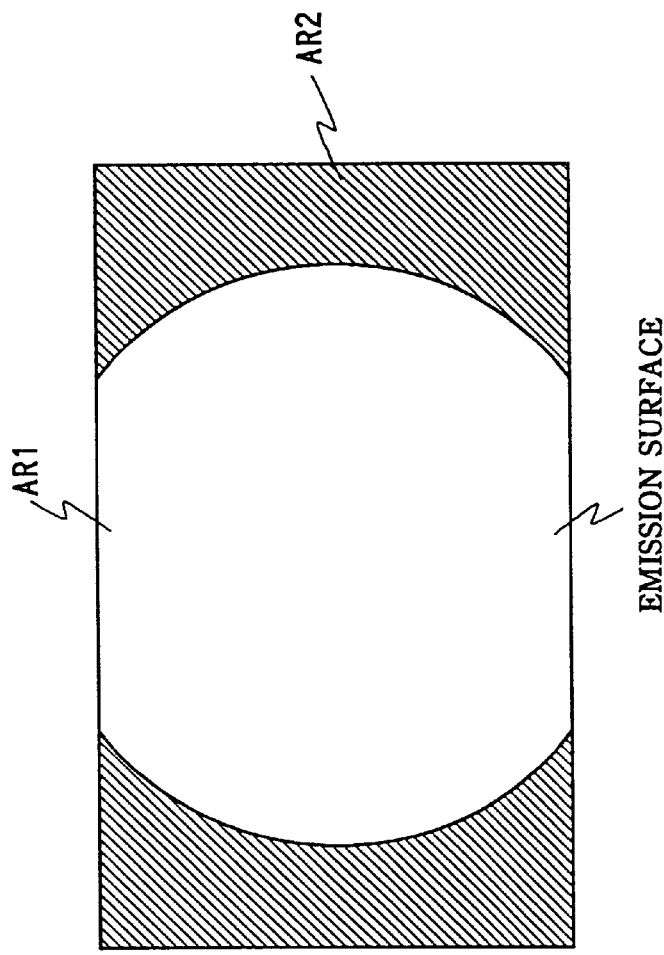

SURFACE LIGHT SOURCE DEVICE OF SIDE LIGHT TYPE

BACKGROUND

1. Field of Invention

The present invention relates to a surface light source device of side light type, in particular to a surface light source device of side light type in which quality of output illumination light is improved by eliminating reduction in luminance in areas both side portion of a light guide plate. The present invention is applicable to back lighting of a liquid crystal display, for example.

2. Related Art

A surface light source device of side light type has conventionally been applied to, for example, a liquid crystal display for illuminating a liquid crystal panel from the back thereof. This arrangement is suitable for reducing thickness over all.

The surface light source device of side light type usually employs a rod-like light source such as a cold cathode tube as a primary light source arranged beside a guide plate (plate-like guide body). Illumination light emitted from the primary light source is introduced into the guide plate through a side end surface (incidence end surface) of the guide plate. Illumination light thus introduced propagates through the guide plate while being emitted toward the liquid crystal panel from one (emission surface) of major surfaces of the guide plate.

Guide plates employable for surface light source devices of side are of two types, a type having a generally uniform thickness and another type having thickness decreasing gradually away from the primary light source. Generally, the latter emits illumination light more efficiently than the former.

FIG. 6 is an exploded perspective view showing a conventional surface light source device of side light type employing the guide plate of the latter type. FIG. 7 shows a cross section taken in line A—A in FIG. 6. Referring to FIGS. 6 and 7, a surface light source device of side light type 1 comprises a guide plate 2, a primary light source 3, a reflection sheet 4, and a prism sheet 5 serving as a light control member. The reflection sheet 4, the guide plate 3 and the prism sheet 5 are laminatedly arranged. The primary light source 3 is arranged beside the guide plate 2.

The guide plate 2 is made of a light scattering guide body having a wedge-shaped cross section and is called light scattering guide plate. The light scattering guide body includes, for example, a matrix of PMMA (polymethyl methacrylate) and a multiplicity of translucent fine particles dispersed uniformly in the matrix. Refractive index of the fine particles is different from that of the matrix.

The primary light source 3 includes a cold cathode tube (fluorescent lamp) 7 and a reflector 8 having a generally semicircular cross section arranged on the back surface thereof. The reflector 8 includes a regular or irregular reflection sheet. Illumination light is supplied toward an incidence end surface 2A constituting a side end surface of the light scattering guide plate 2 through an opening of the reflector 8. The reflection sheet 4 consists of a sheet-like regular reflection member made of a metal foil or the like or a sheet-like irregular reflection member made of a white PET film or the like.

Illumination light is introduced into the guide plate 2 through the incidence end surface 2A, and while being reflected between two major surfaces (back surface 2B and emission surface 2C), propagates toward the distal end.

In the meantime, illumination light is scattered by the fine particles in the guide plate 2. In a case where the reflection sheet 4 made of the irregular reflection member is employed, illumination light is also irregularly reflected by the reflection sheet 4.

Incidence angle of illumination light to the emission surface 2C gradually decreases according to repeated reflections by the inclined back surface 2B. Such decrease of incidence angle increases components having a critical angle or less with respect to the emission surface and thus promotes emission from the emission surface. As a result, lack of emission light in an area far from the primary light source 3 is prevented.

Illumination light emitted from the emission surface 2C, which has experienced light scattering due to the fine particles in the light scattering guide plate 2 or irregular reflection on the reflection sheet 4 in addition thereto, has property of scattered light. The main direction of propagation of illumination light from the emission surface 2C, however, inclines toward a distal end with respect to the frontal direction (in direction away from the incidence end surface 2A) regarding in a plane row perpendicular to the incidence end surface 2A. That is, the light emitted from the light scattering guide plate 2 has a directivity. This property is called emission directivity.

If the back surface 2B is a smooth surface, direction of propagation of illumination light from the emission surface 2C expands toward two sides symmetric about the frontal direction regarding in a plane row parallel to the incidence end surface 2A. That is, when viewed from the incidence end surface 2A, illumination light contains components emitted obliquely rightward and leftward. In order to correct such components directionally and increase emission in the frontal direction, a prism surface (light control surface) is formed also on the back surface 2B. This prism surface has a great number of parallel prism rows. These prism rows run generally at right angles to the incidence end surface 2A. As indicated by arrow B, each prism row is configured of a minute projection having a triangular cross section, for example. Slopes 2E, 2F of these projections correct direction of light propagation so as to increase emission toward the frontal direction regarding in a plane row parallel to the incidence end surface 2A.

The prism sheet 5 arranged along the emission surface 2C is made of a translucent sheet material of polycarbonate or the like. The prism sheet 5 has a prism surface formed with a great number of parallel prism rows. In this example, the prism sheet 5 faces toward the guide plate 2 and the prism rows are oriented so as to extend generally in parallel to the incidence end surface 2A.

As indicated by arrow C, each prism row is configured of a minute projection having a triangular cross section, for example. Slopes 5A, 5B of these projections correct the obliquely-emitted illumination light in the frontal direction regarding in a plane row perpendicular to the incidence end surface 2A. The above-mentioned related art, however, has a problem yet to be solved. That is, as shown in FIG. 8, in the conventional surface light source device described above, a central area AR1 of the emission surface provides a high luminance, whereas an areas AR2 near both side portions provide a lower luminance level. The areas AR2 appear darker than the area AR1. This reduced luminance tends to be more conspicuous for a larger screen size (or a larger size of the emission surface 2C) of the display for which the surface light source device is applied.

OBJECT AND SUMMARY OF INVENTION

The present invention solves the above-mentioned problem. An object of the present invention is to provide a surface light source device of side light type which is capable of effectively avoiding reduction in luminance in areas near both side portions of the emission surface.

The present invention is applicable to a surface light source device of side light type comprising a guide plate having two major surfaces providing an emission surface and a back surface, and a primary light source for supplying illumination light from an incidence end surface of the guide plate, in which at least one of the two major surfaces of the guide plate provides a light control surface formed with repetitive projections running generally at right angles to the incidence end surface. The light control surface (repetitive projections) may be formed on either the back surface or the emission surface thereof.

According to this invention, inclination angles of a pair of slopes of each projection of the light control surface are equal to each other at a generally central portion of the emission surface of the guide plate, but each inner slope (slope relatively nearer to the central portion) and each outer slope (slope relatively farther from the central portion) have different inclinations in areas near to both side portions as viewed from the incidence end surface. Inclination angle of each slope is defined as an angle with respect to a normal to a general plane of the guide plate.

It is preferable that difference of inclination angles between each pair of slopes gradually increases toward the areas near to both side portions as viewed from the incidence end surface. The present invention is applicable especially advantageously to cases employing a guide plate of a shape which is longer along the incidence end surface than along the running direction of the projections.

More detailed features of the present invention will be understood from the following description of embodiments with reference to the accompanying drawings.

BRIEF DESCRIPTION OF DRAWINGS

FIG. 3 is a perspective view for explaining a measurement for obtaining the graph of FIG. 2;

FIG. 4 is a perspective view for explaining a principle of correcting reduced luminance areas near to both side portions;

FIG. 8 is a diagram showing reduction in luminance according to prior arts.

EMBODIMENTS (1) First Embodiment

Figure 6A:
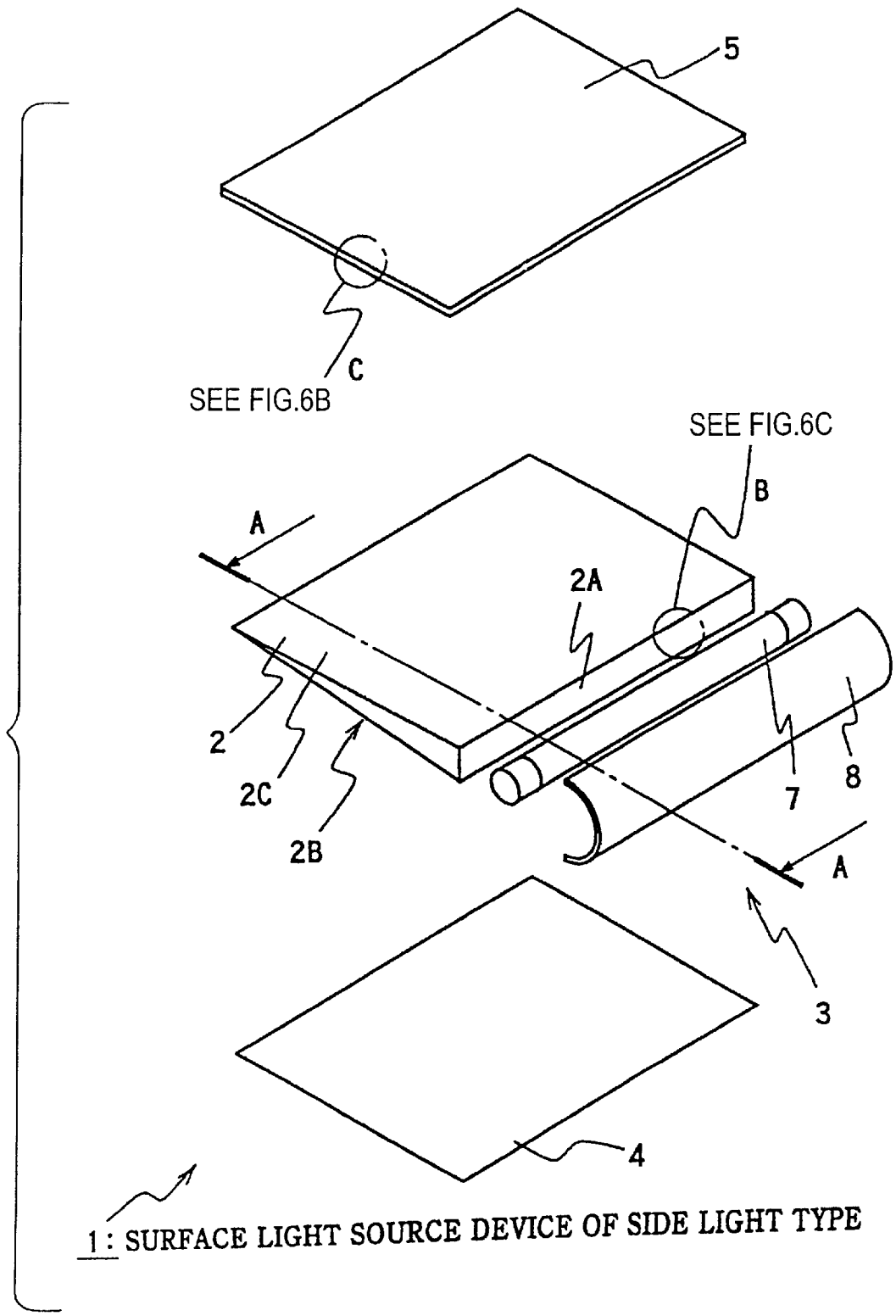
FIG. 6 is an exploded perspective view showing a conventional surface light source device of side light type.
Figure 6B:
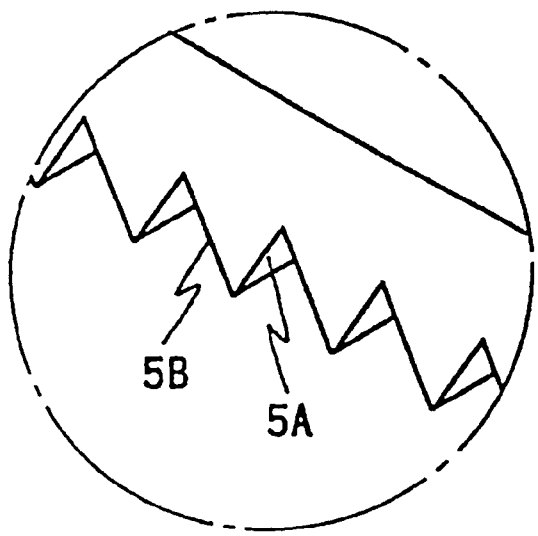
Figure 6C:
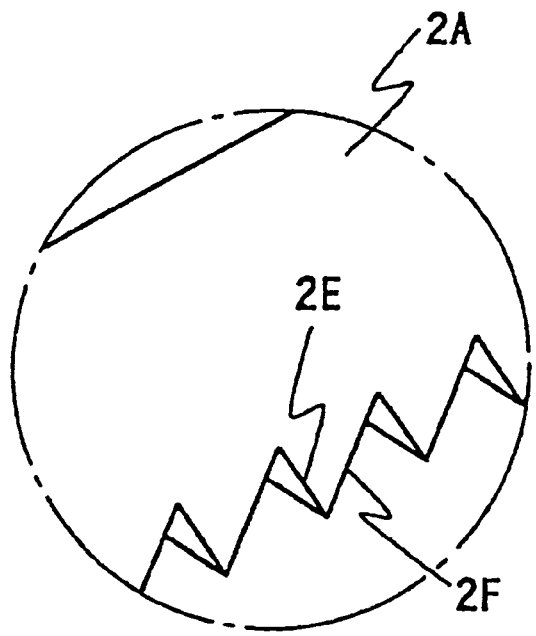
Figure 7:
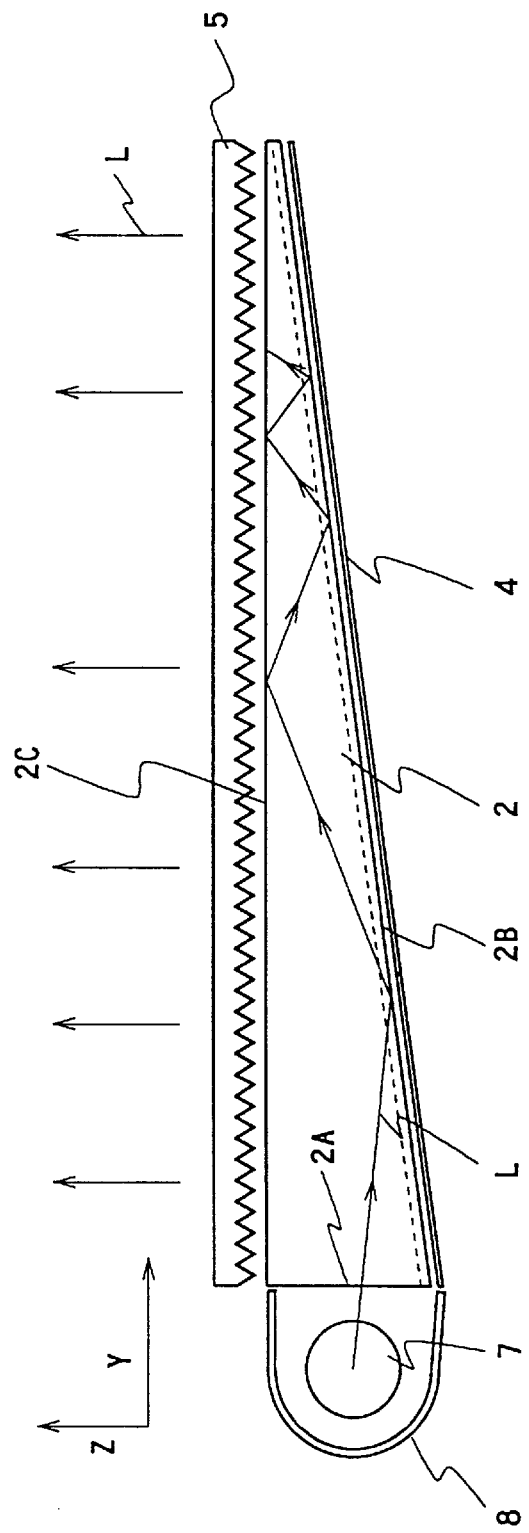
FIG. 7 is a sectional view taken in line A—A in FIG. 6.

Referring to FIG. 1, a surface light source device of side light type 10 according to a first embodiment of the present invention is illustrated to be compared with FIG. 6. Elements common to FIG. 6 are designated by the same reference numerals, respectively, and will not be explained in dedistal. The surface light source device 10 comprises a primary light source 3, a reflection sheet 4, a light scattering guide plate 12, and a prism sheet 5 functioning as a light control member. The reflection sheet 5, the guide plate 12 and the prism sheet 5 are laminatedly arranged in order. The primary light source 3 is arranged along a side end surface (incidence end surface) 12A of the guide plate 12.

The guide plate 12 has a back surface 12B and an emission surface 12C as two major surfaces. The light scattering guide plate 12 has a wedge-shaped cross section, and the contour of the emission surface is rectangular. The incidence end surface 12A corresponds to a long side. That is, length W along the incidence end surface 12A is larger than length H in a direction perpendicular to the incidence end surface 12A. In a case where a liquid display panel having a laterally long screen is illuminated by this surface light source device 10, the primary light source 3 is arranged, in this illustration, along the upper side or the lower side of the liquid crystal display panel. In other words, direction along the incidence end surface 12A corresponds to the lateral direction as viewed by a viewer.

A material of the light scattering guide plate 12 includes a matrix of PMMA (polymethyl methacrylate), for example, and a great number of translucent fine particles dispersed uniformly therein. Refractive index of these fine particles is different from that of the matrix.

The reflection sheet 4 is sheet-like regular reflection member made of a metal foil or the like or a sheet-like irregular reflection member made of a white PET film or the like. Illumination light L emitted from a fluorescent lamp 7 is introduced, directly or after being reflected on a reflector 8, into the guide plate 12 by way of the incidence end surface 12A. Illumination light thus introduced, propagates within the guide plate 12 while being repeatedly reflected between the back surface 12B and the emission surface 12C.

The light that has leaked from the back surface 12B is reflected by the reflection sheet 4 and returned into the guide plate 12. In the process, the light is scattered by a great number of fine particles. If the reflection sheet 4 is of irregular reflection type, the light is scattered also by the reflection sheet 4. Due to the wedge-shaped cross section of the guide plate 12, the incidence angle to the emission surface 12C decreases at every reflection on the back surface 12C. Components angularly below the critical angle to the emission surface 12C are emitted from the emission surface 12C.

Projections (see arrows D, E, F) formed repeatedly on the back surface 12B run generally at right angles to the incidence end surface 12A. These projections correct directivity toward the frontal direction regarding in a plane row parallel to the incidence end surface 12A. After emission from the emission surface 12C, directivity of the light is corrected toward the frontal direction regarding in a plane row perpendicular to the incidence end surface 12A by slope pairs (see arrow C in FIG. 6) of a great number of projections of the prism sheet 5. The projections of the prism sheet 5 run generally in parallel to the incidence end surface 12A.

The present embodiment is characterized by inclination of the slope pairs of a great number of the projections formed on the back surface 12B. The projections are repetitively formed along the incidence end surface 12A and provide a prism surface functioning as a light control surface. Each projection includes a pair of slopes 12E, 12F. These slopes change light path mainly by reflection and correct directivity of illumination light emitted from the emission surface 12C regarding in a plane row parallel to the incidence end surface 12A. Pitch of repetition of the projections is about 50 $\mu$gm, for example. Each projection runs with a uniform cross-sectional configuration toward a wedge distal end generally in a direction perpendicular to the incidence end surface 12A.

What is important here is that shapes of the cross sections of projections at a central portion (arrow D) are different from shapes of the cross sections of projections near the side portions (arrows E, F) as viewed from the incidence end surface 12A.

For each projection, inclination angle of one slope 12E is expressed by α, and inclination angle of the other slope 12F by β. Inclination angles α, β are defined as angles with respect to a normal to a general plane of the guide plate 12.

First, as plotted in partly enlarged form and designated by character D, inclination angles α and β are equal to each other at the central portion. In this case, the slopes 12E, 12F look symmetric as viewed from the incidence end surface 12A, and therefore, a main direction of emission at the central portion of the emission surface 12C is generally perpendicular to the emission surface 12C.

Near the side portions, in contrast, as plotted in partly enlarged form and designated by characters E and F, angle α or β of the inner slope 12E or 12F is larger than angle β or α of the outer slope 12F or 12E, respectively. The word "inner" means that the slope is nearer to the center in direction along the incidence end surface 12A, and the word "outer" means that the slope is farther from the center.

Such difference in inclination angle functions to incline the main direction of emission toward the center of the emission surface 12C in an area near the side portions of the emission surface 12C regarding in a plane row parallel to the incidence end surface 12A. As a result, reduction in luminance near the side portions (see FIG. 8) may be effectively avoided even if the guide plate 12 has a sharp Emission directivity.

Also, this effect has a large significance especially in a case where the side portions correspond to the lateral direction of a laterally-long screen. Because, if all the projections have an equally inclined slope (α=β), reduction in luminance near both side portions would be rather striking. The above-mentioned function effectively prevents such remarkable reduction in luminance.

It is preferable that difference between inclination angles α and β gradually decrease from the side portions toward the central portion. This makes it possible to avoid unnatural luminance change of the emitted light.

In a preferable example, angle α (or β) of the inner slope 12E (or 12F) is designed at 60 degrees for the right (left) side portion, and angle β (or α) of the outer slope 12F (or 12E) is designed at 10 degrees for the right (left) side portion, respectively. The central portion is designed at α=β=50 degrees.

Figure 1A:
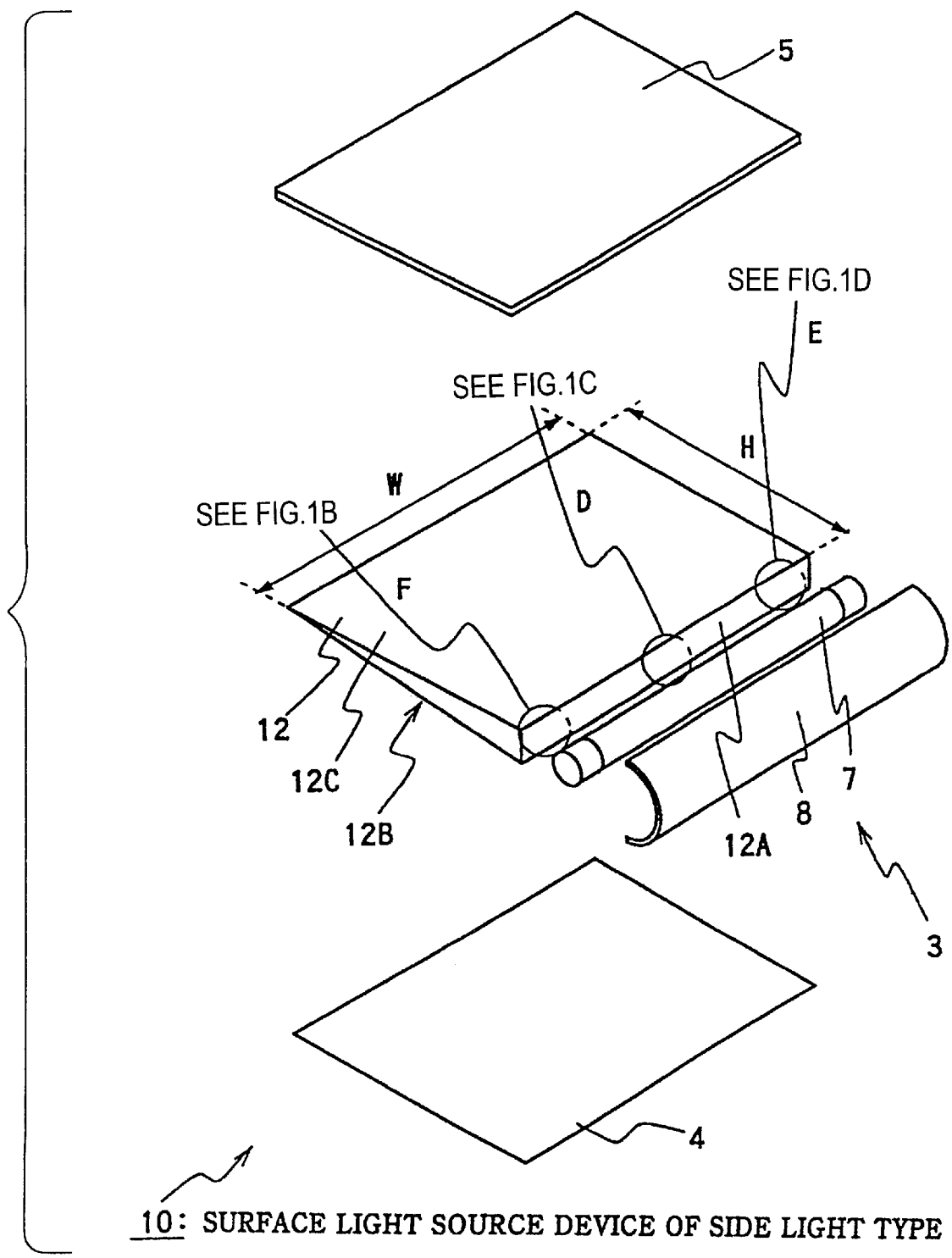
FIG. 1 exploded perspective view showing a surface light source device of side according to a first embodiment of the present invention.
Figure 1B:
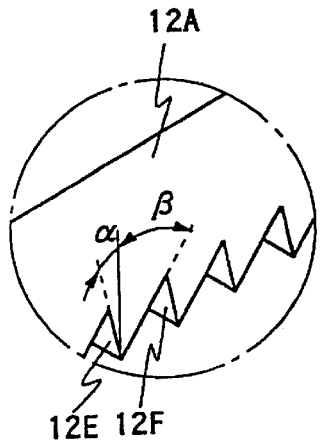
Figure 1C:
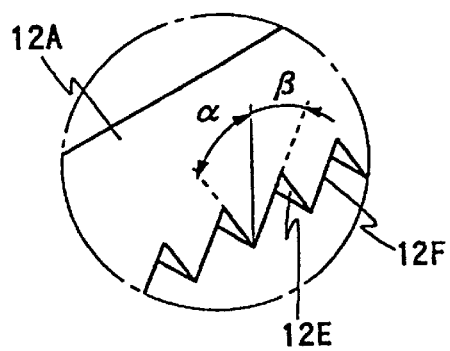
Figure 1D:
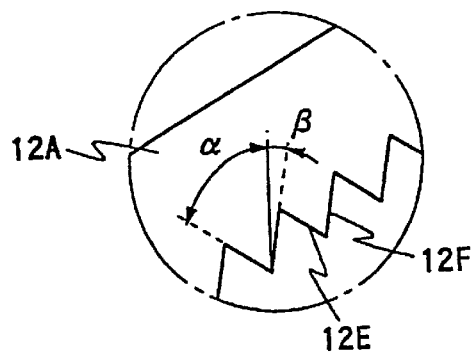
Figure 2:
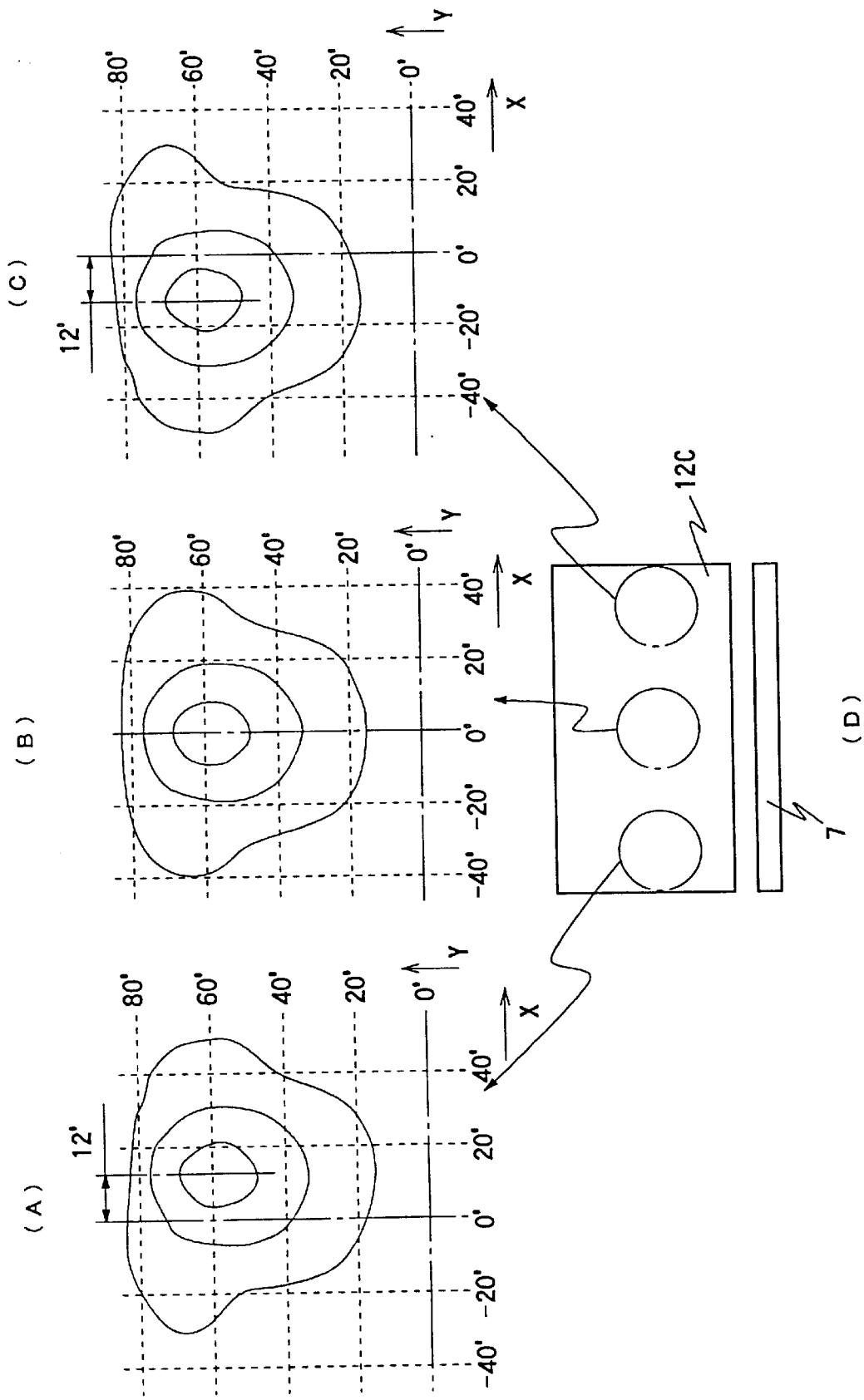
FIG. 2 is a graph or explaining directivity of illumination light emitted from a light scattering guide plate of the surface light source device shown in FIG. 1.
Figure 5A:
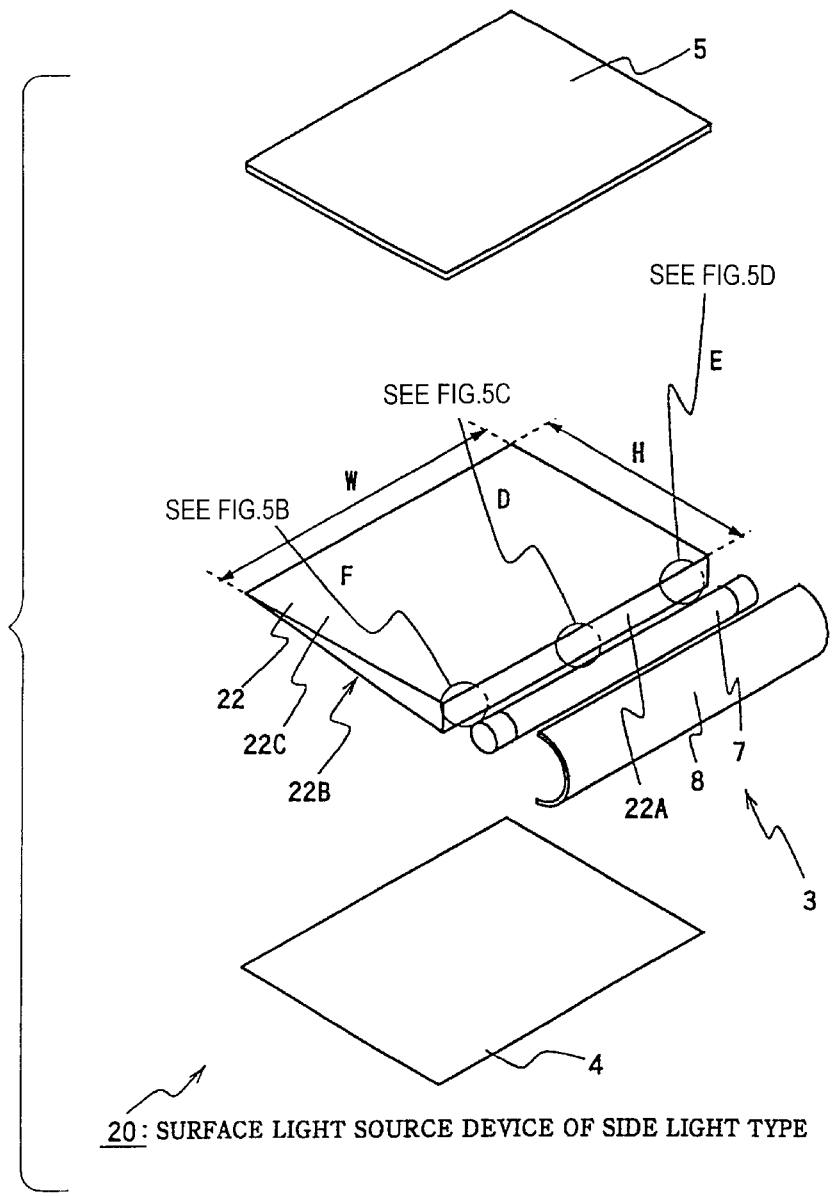
FIG. 5 in exploded perspective view showing a surface light source device of side light type according to a second embodiment of the present invention.
Figure 5C:
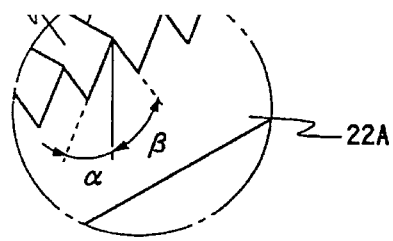
Figure 5B:
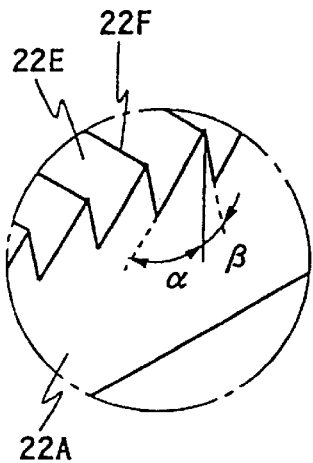
Figure 5C:
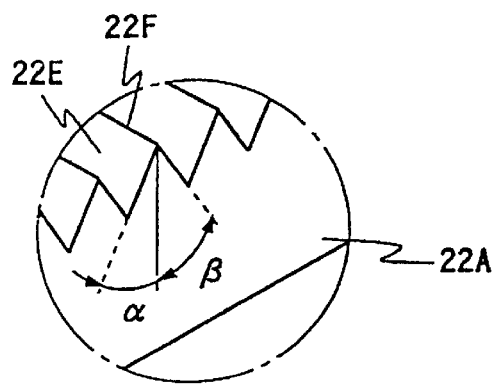
Figure 5D:
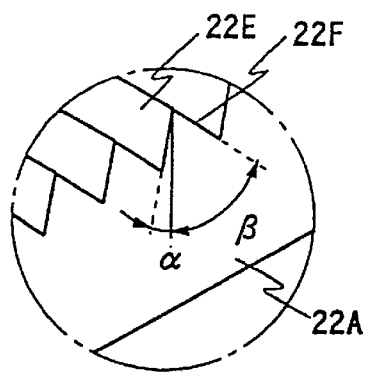

After all, according to this embodiment, the whole emission surface 12C appears bright when observed from the front of the central portion of the emission surface 12C regarding in a plane row parallel to the incidence end surface 12A (directions ±X in FIG. 2). In a plane row at a right angle to the incidence end surface 12A (directions ±Y in FIG. 2), light is emitted obliquely toward the wedge-shaped distal end, but this diagonal emission may be corrected by the prism sheet 5.

Graphs (A) to (C) in FIG. 2 represent directions of emission of emitted light as expressed by equi-brightness curves in the first embodiment. Measuring points on three frontal positions shown in (D). As shown in FIG. 3, rightward inclination, with respect to a normal to the emission surface 12C, as viewed from the incidence end surface 12A is expressed as +X and leftward inclination as −X. Also, inclination toward the wedge-shaped distal end corresponds to +Y and inclination the incidence end surface corresponds to −Y. From the graphs of FIG. 2, the following is understood.

(1) As shown in graph (B), the central portion is brightest in direction of X=0 degree. That is, a priority emission occurs in the frontal direction regarding in a plane parallel to the incidence end surface 12A.

(2) As shown in graph (A), the left-hand side portion and its neighborhood leftward of the central portion as viewed from the incidence end surface 12A is brightest in direction of X=about 12 degrees. That is, a priority emission occurs disproportionately obliquely inward from the frontal direction regarding in a plane row parallel to the incidence end surface 12A.

(3) As shown in graph (C), the right-hand side portion and its neighborhood rightward of the central portion as viewed from the incidence end surface 12A is brightest in direction of X=about −12 degrees. That is, a priority emission occurs disproportionately obliquely inward from the frontal direction regarding in a plane row parallel to the incidence end surface 12A.

These results reflect the fact that inclination of the main emission increases toward the left and right side portions. These results are brought about by gradually changing of difference between α and β described above (α=β at the central portion).

A state in which directivity is corrected to Y=about 0 degree by the prism sheet 5 will be studied with reference to FIG. 4. When the emission surface 12C is observed from the frontal of the central portion of the emission surface 12C, illumination light is emitted from each area along the line of sight directed to the emission surface 12C.

As a result, even when the emitted light has a sharp directivity, reduction in luminance in the side portions and the neighborhood thereof (actual reduction in luminance for the viewer) may be effectively avoided. Also, waste of illumination light is reduced and apparent brightness may be increased correspondingly.

It will be obvious from the foregoing description that such an advantage has a large significance especially in the case where the side portions of the guide plate correspond to the lateral direction of a laterally-long screen.

It should be noted here that such a feature results in one collateral advantage. That is, when direction of observation is displaced slightly from the exact front of the emission surface 12C, the display screen darkens strikingly, thereby preventing a furtive glance by other than the user of the display. This advantage will exhibit its effect when a portable unit having a display with back lighting is used in a vehicle compartment.

(2) Second Embodiment

Referring to FIG. 5, a surface light source device of side light type according to a second embodiment of the present invention is drawn in a manner similar to FIG. 1. Elements in this drawing shared by the corresponding elements in FIG. 1 or 6 are designated by the same reference numerals respectively and are described again only briefly. The surface light source device 20 comprises the primary light source 3, the reflection sheet 4, a light scattering guide plate 22 and the prism sheet 5 functioning as a light control member. The reflection sheet 4, the guide plate 22 and the prism sheet 5 are laminatedly arranged. The primary light source 3 is arranged along a side end surface (incidence end surface) 22A of the guide plate 22.

The guide plate 22 has a back surface 22B and an emission surface 22C as two major surfaces. The light scattering guide plate 22 has a wedge-shaped cross section and the contour of the emission surface is rectangular. The incidence end surface 22A corresponds to a long side. Namely, length W along the incidence end surface 22A is larger than length H in direction perpendicular to the incidence end surface 12A. In a case where a liquid crystal panel having a laterally-long screen is illuminated by this surface light source device 20, the primary light source 3 is arranged, in the illustration, along the upper side or the lower side of the liquid crystal display panel. In other words, direction along the incidence end surface 22A corresponds to the lateral direction as viewed from the viewer.

Material of the light scattering guide plate 22 is the same as that of the light scattering guide plate 12 in the first embodiment. The reflection sheet 4 is a sheet-like regular reflection member made of a metal foil or the like or a sheet-like irregular reflection member made of a white PET film or the like. Illumination light L emitted from the fluorescent lamp 7, directly or after being reflected on the reflector 8, is introduced into the guide plate 22 from the incidence end surface 22A. Illumination light thus introduced propagates through the guide plate 22 while being repeatedly reflected between the back surface 22B and the emission surface 22C.

The light that has leaked from the back surface 22B is reflected on the reflection sheet 4 and returned into the guide plate 22. In the meantime, the light is scattered by a great number of fine particles. If the reflection sheet 4 is of irregular reflection type, the light is also scattered by it. Since the guide plate 22 has a wedge-shaped cross section, the incidence angle with respect to the emission surface 22C decreases at every reflection by the back surface 22B. Components not more than the critical angle to the emission surface 22C are emitted from the emission surface 22C.

A feature of the present embodiment is that the emission surface 22C, but not the black surface 22B (compare to the first embodiment), provides a light control surface (prism surface). This light control surface has a great number of projections.

The projections (see arrows D, E, F) formed repetitively on the emission surface 22C run generally at right angles to the incidence end surface 22A. These projections correct directivity in the frontal direction regarding in a plane row parallel to the incidence end surface 22A. After emission from the emission surface 22C, directivity is corrected toward the frontal direction regarding in a plane row perpendicular to the incidence end surface 22A by slope pairs of a great number of the projections of the prism sheet 5 (see arrow C in FIG. 6). The projections of the prism sheet 5 run generally parallel to the incidence end surface 22A.

This embodiment is characterized by inclination of the slope pairs of a great number of the projections formed on the emission surface 22C. Each projection has a pair of slopes 22E and 22F. These slopes change light path mainly by refraction to correct directivity of illumination light emitted from the emission surface 22C regarding in a plane row parallel to the incidence end surface 22A. Repetition pitch of the projections is about 50 $\mu$gm, for example. Each projection runs with a uniform cross section toward the distal of the wedge in direction generally at right angles to the incidence end surface 22A.

What is important is that the shape of the cross section (arrow D) of the projections on the central portion is different from that of the projections on the side portions (arrows E, F) as viewed from the incidence end surface 22A.

Like in FIG. 1, inclination angle of one slope 22E of each projection is expressed by $\alpha$ and inclination angle of the other slope as $\beta$. Inclination angles $\alpha$, $\beta$ are defined as angles with respect to a normal to a general plane of the guide plate 22.

On the central portion (character D), inclination angles $\alpha$ and $\beta$ are equal to each other. In this case, the slopes 22E, 22F are symmetric about the incidence end surface 22A, and therefore the main direction of emission on the central portion of the emission surface 22C is a direction generally normal to the emission surface 22C.

On the side portions, in contrast, as drawn in partly enlarged form and designated by reference characters E and F, angle $\alpha$ or $\beta$ of the inner slope 22E or 22F of each projection is smaller than angle $\beta$ or $\alpha$ of the outer slope 22F or 22E, respectively. The word "inner" means that the slope is nearer to the center in direction along the incidence end surface 22A, and the word "outer" means that the slope is far from the center.

Such difference of inclination angle functions to incline the main direction of emission toward the center of the emission surface 22C in an area near the side portions of the emission surface 22C regarding in a plane row parallel to the incidence end surface 22A. As a result, reduction in luminance (see FIG. 8) near the side portions may be effectively avoided even if the guide plate 22 has a sharp emission directivity.

Also, this effect has a large significance especially in a case where the side portions correspond to the lateral direction of a laterally-long screen. Because, if all the projections have equal slopes ($\alpha=\beta$) in such a case, reduction in luminance near both side portions would be rather striking. The function described above effectively avoids such a remarkable reduction in luminance.

preferably difference between inclination angles $\alpha$ and $\beta$ gradually decreases from the side portions toward the central portion. As a result, unnatural change in luminance of the emitted light may be avoided.

According to one preferable example, angle $\alpha$ (or $\beta$) of the inner slope 22E (or 22F) is designed at 10 degrees for the right (left) side portion, and angle $\beta$ (or $\alpha$) of the outer slope 22F (or 22E) is designed at 60 degrees for the right (left) side portion. The central portion is designed at $\alpha=\beta=50$ degrees It will be apparent from the foregoing description that the present embodiment also has operations and advantages similar to those of the first embodiment. That is, as described above with reference to FIG. 4, when the emission surface 22C is viewed from the frontal direction of the central portion of the emission surface 22C, illumination light is emitted from each area along the line of sight directed to the emission surface 22C.

As a result, even if the emitted light has a sharp directivity, reduction in luminance near the side portions (actual reduction in luminance for a viewer) may be effectively avoided. Also, waste of illumination light may be correspondingly reduced and apparent brightness may be increased.

It will be apparent that these advantages have a large significance especially in the case where the side portions of the guide plate correspond to the lateral direction of a laterally-long screen. A furtive glance from an adjacent seat may be prevented in a similar manner to the first embodiment.

(3) Modifications

The embodiments described above are not intended to limit the scope of the present invention. For example, the following modifications are possible.

(i) Pitches of the projections formed on the back surface or the emission surface of the guide plate may not be constant. For example, pitches may be varied partially. Also, the height of the projections may not be constant.

(ii) In the embodiments described above, the projections on the light control surface form a triangular cross section by direct connection of a pair of slopes. However, such a configuration does not limit the present invention. For example, a pair of slopes may be connected by a smooth curved surface. Also, the slope itself may be formed as a curved surface.

(iii) In the embodiments described above, projections having a uniform cross-sectional configuration are formed from the incidence end surface toward the wedge distal. This, however, does not limit the invention. For example, the shape of the cross-sectional configuration of the projections may be varied from the incidence end surface toward the wedge distal.

(iv) The emission surface of the guide plate may be, wholly or partly, provided with the light scattering function by matting process, applying ink or others.

(v) The present invention is applicable also to a case which employs a guide plate having both the back surface and the emission surface thereof formed with projections.

(vi) The translucent material constituting the prism sheet is not specifically limited. For example, polymethyl methacrylate (PMMA) or the like may be employed. Also, the prism sheet preferably has a flexibility. Nevertheless, an element having substantially no flexibility such as what is called a prism body may also be employed.

(vii) The prism sheet may be eliminated in some cases. Also, the present invention is applicable to a case in which a light scattering sheet for scattering illumination light is arranged in place of or in addition to the prism sheet.

(viii) In the first embodiment described above, a light-scattering guide plate containing translucent fine particles was employed. However, other types of light scattering guide plate may be used. Also, a transparent guide plate may be employed.

(ix) The cross-sectional configuration of the guide plate is not necessarily wedge-shaped. For example, a guide plate having a uniform thickness may be employed.

(x) The incidence surface of the guide plate may be set on two or more end surfaces. A plurality of primary light sources may be provided correspondingly.

(xi) The primary light source may include a light source element other than a rod-like light source such as a fluorescent lamp. For example, a plurality of pointlike light sources such as light emitting diodes may be arranged to form the primary light source.

(xii) Surface light source devices according to this invention may be applied to other than to back lighting of a liquid crystal display. For example, it is widely applicable to various illumination equipments and displays.

What is claimed is:

1. A surface light source device of side light type, comprising:
    a guide plate having two major surfaces to provide an emission surface and a back surface; and
    a primary light source to supply illumination light from an incidence end surface of said guide plate,
    wherein at least one of the two major surfaces provides a light control surface on which a plurality of projections running generally at right angles to the incidence end surface are arranged repetitively,
    each of the projections includes a pair of slopes, and
    respective inclination angles of the pair of slopes with respect to a normal to a general plane of said guide plate are equal to each other on a generally central portion of the emission surface, and an inner slope and an outer slope of the pair of slopes have different angles on areas near both side portions, as viewed from the incidence end surface.

2. The surface light source device of side light type according to claim 1, wherein a difference between inclination angles of the pair of slopes increases gradually from around the central portion of the emission surface toward the areas near both side portions, as viewed from the incidence end surface.

3. The surface light source device of side light type according to claim 1, wherein said guide plate has a shape which is longer along the incidence end surface than along the running direction of the projections.

4. A surface light source device of side light type, comprising:
    a guide plate having two major surfaces to provide an emission surface and a back surface; and
    a primary light source for supplying illumination light from an incidence end surface of said guide plate,
    wherein the back surface provides a light control surface on which a plurality of projections running generally at right angles to the incidence end surface are arranged repetitively,
    each of the projections includes a pair of slopes, and
    respective inclination angles of the pair of slopes with respect to a normal to a general plane of said guide plate are equal to each other on a generally central portion of the emission surface, and an inclination angle of an inner slope of the pair of slopes is larger than an inclination angle of an outer slope thereof on areas near both side portions, as viewed from the incidence end surface.

5. A surface light source device of side light type, comprising:
    a guide plate having two major surfaces to provide an emission surface and a back surface; and
    a primary light source for supplying illumination light from an incidence end surface of said guide plate,
    wherein the emission surface provides a light control surface on which a plurality of projections running generally at right angles to the incidence end surface are arranged repetitively,
    each of the projections includes a pair of slopes, and
    respective inclination angles of the pair of slopes with respect to a normal to a general plane of said guide plate are equal to each other on a generally central portion of the emission surface, and an inclination angle of an inner slope of the pair of slopes is smaller than an inclination angle of an outer slope thereof on areas near both side portions, as viewed from the incidence end surface.

6. A surface light apparatus, comprising a side light type guide plate having an incidence end surface and two major surfaces including an emission and back surface, wherein at least one of the major surfaces has columns of projections arranged lengthwise at right angles to the incidence surface and each projection includes a pair of slopes, the pair of slopes varying based on whether the projection is in a central portion of said guide plate or side portions of said guide plate with respect to said incidence end surface.

7. The surface light apparatus of claim 6, wherein the columns of projections are at least on the back surface.

8. The surface light apparatus of claim 6, wherein the columns of projections are at least on the emission surface.

9. The surface light apparatus of claim 6, wherein the varying of slopes of the projection is gradual from side to side of the guide plate.

10. A method of eliminating reduction in luminance around both side portions in a surface light source, the surface light source including a light source and a side light type guide plate with an incidence end surface and having emission and back surfaces, comprising:

varying slopes of projections arranged in columns lengthwise at right angles to the incidence end surface on one of the emission or back surfaces based on whether a projection column is on a side portion or central portion of the guide plate with respect to said incidence end surface.

* * * * *

UNITED STATES PATENT AND TRADEMARK OFFICE
CERTIFICATE OF CORRECTION

PATENT NO. : 6,155,692
DATED : December 5, 2000
INVENTOR(S) : Ohkawa

It is certified that error appears in the above-identified patent and that said Letters Patent is hereby corrected as shown below:

Column 1,
Line 10, after "areas" insert -- near --.

Column 2,
Line 10, after "and" insert -- , --.

Column 3,
Line 38, after "Fig. 1" insert -- is an --.

Column 4,
Line 66, change "$\mu$gm" to -- $\mu$m --.

Column 5,
Line 33, change "Emission" to -- emission --.
Line 55, delete "in"; and
Line 63, insert -- of -- before "curves" and then delete "on".

Column 7,
Line 58, change "$\mu$gm" to -- $\mu$m --; and
Line 67, change "a" to -- $\alpha$ --.

Column 8,
Line 28, delete ", if";
Line 33, change "preferably" to -- Preferably, --; and
Line 41, Signed and Sealed this Second Day of October, 2001

Attest:

NICHOLAS P. GODICI
Attesting Officer　　Acting Director of the United States Patent and Trademark Office